(12) United States Patent
Komoriya et al.

(10) Patent No.: US 8,870,298 B2
(45) Date of Patent: Oct. 28, 2014

(54) BRAKE CONTROL DEVICE

(71) Applicant: Mitsubishi Heavy Industries, Ltd., Tokyo (JP)

(72) Inventors: Toshihiko Komoriya, Tokyo (JP); Teruo Yamashita, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 10 days.

(21) Appl. No.: 13/684,872

(22) Filed: Nov. 26, 2012

(65) Prior Publication Data

US 2013/0134769 A1 May 30, 2013

(30) Foreign Application Priority Data

Nov. 30, 2011 (JP) .................................. 2011-262823

(51) Int. Cl.
| | |
|---|---|
| *B60T 11/20* | (2006.01) |
| *B60T 13/40* | (2006.01) |
| *B60T 13/66* | (2006.01) |
| *B60T 13/68* | (2006.01) |
| *B60T 15/02* | (2006.01) |

(52) U.S. Cl.
CPC ............... *B60T 13/40* (2013.01); *B60T 13/662* (2013.01); *B60T 13/683* (2013.01); *B60T 15/027* (2013.01); *Y10S 303/10* (2013.01)
USPC ................ 303/14; 303/7; 303/9.69; 303/128; 303/DIG. 10

(58) Field of Classification Search
USPC .......... 303/14, 3, 7, 8, 9.69, 15, 20, 123, 128, 303/DIG. 10
See application file for complete search history.

(56) References Cited

U.S. PATENT DOCUMENTS 5,700,065 A * 12/1997 Jamieson ......................... 303/19
8,246,121 B2 8/2012 Homann et al.

FOREIGN PATENT DOCUMENTS

| CN | 1792691 | 6/2006 |
|---|---|---|
| CN | 1948064 | 4/2007 |
| CN | 202006806 | 10/2011 |
| EP | 2 340 972 | 7/2011 |

(Continued)

OTHER PUBLICATIONS

Japanese Notice of Reasons for Rejection issued Sep. 17, 2013 in corresponding Japanese Patent Application No. 2011-262822 with English translation.

(Continued)

*Primary Examiner* — Pamela Rodriguez
(74) *Attorney, Agent, or Firm* — Wenderoth, Lind & Ponack, L.L.P.

(57) ABSTRACT

A brake control device includes a relay valve that generates a first drive pressure for driving a brake, from an air pressure generated by a first air supply source, based on an pilot pressure applied, and a double check valve that connects the relay valve and a second air supply source that generates a second drive pressure separate to the first air supply source, and that communicates the drive pressure which is generated in either the relay valve or the second air supply source, with the brake. The device also includes a variable load valve that outputs a first pressure according to a pressure of an air spring fitted on a vehicle side, a first solenoid valve group which generates the pilot pressure from the air pressure during service operation, and a second solenoid valve group which outputs, as the pilot pressure, a second pressure according to the first pressure output from the variable load valve during emergency operation.

2 Claims, 7 Drawing Sheets

(56) References Cited

FOREIGN PATENT DOCUMENTS

| | | |
|---|---|---|
| EP | 2 505 451 | 10/2012 |
| JP | 4-127065 | 11/1992 |
| JP | 2000-272501 | 10/2000 |
| JP | 2005-67312 | 3/2005 |
| JP | 2006-168664 | 6/2006 |
| JP | 4310149 | 8/2009 |
| JP | 4435727 | 3/2010 |
| JP | 4485347 | 6/2010 |
| JP | 4699020 | 6/2011 |
| WO | 2010/032677 | 3/2010 |
| WO | 2011/024406 | 3/2011 |
| WO | 2011/064851 | 6/2011 |

OTHER PUBLICATIONS

Japanese Notice of Reasons for Rejection issued Sep. 24, 2013 in corresponding Japanese Patent Application No. 2011-262823 with English translation.

Office Action issued Aug. 20, 2014 in U.S. Appl. No. 13/686,006.

Office Action issued Jul. 22, 2014 in Chinese Application No. 201210599101.6, with English translation thereof.

\* cited by examiner

BRAKE CONTROL DEVICE

TECHNICAL FIELD

The present invention relates to a brake control device which is installed in a railway vehicle and operates an air brake.

Priority is claimed on Japanese Patent Application No. 2011-262823, filed Nov. 30, 2011, the contents of which are incorporated herein by reference.

BACKGROUND ART

Conventionally, there is known a brake control device for a railway vehicle, comprising as a brake system for service operation; a pressure control section which outputs a brake command signal (electric signal), a solenoid valve which outputs a brake command pressure (air pressure) according to the brake command signal, and a relay valve which, using the brake command pressure output by the solenoid valve as a control pressure, applies amplification accordingly and outputs the resulting air pressure to a brake cylinder. As a brake system for emergency operation, the brake control device comprises a variable load valve which detects pressure variation in proportion to the total weight of the vehicle including movable load such as passengers and cargo, and provides this detected output to the relay valve.

Typically, because the space for mounting the brake control device on the vehicle is small, there is a problem in how to reduce the size of the device while still maintaining its performance. Schemes are offered such as respectively fixing a relay valve, a double check valve, and a variable load valve on a pipe seat, and accommodating these inside of a housing (casing or the like), or building the variable load valve into the relay valve. Moreover, these are stacked so as to be in blocks, with the above respective constituent elements related as much as possible (refer for example to Japanese Patent No. 4310149 and Japanese Patent No. 4485347).

However, the respective blocks are fixed independently (in block units) with sequential bolts and the like. Therefore, there is the problem in that the assembly operation is complicated, furthermore, removal of the bolts is cumbersome.

In particular regarding the variable load valve, so as to output an appropriate pressure with respect to the pressure (movable load) input from an air spring that detects the movable load of passengers, cargo and the like, it is necessary carry out correction (maintenance) of the output value with respect to the input value, periodically or as required.

However, in the brake control device described above, when correcting the variable load valve, it is not possible to access the variable load valve unless all or a part of the components that are arranged around the variable load valve are removed, making the calibration operation complicated.

Therefore it is an object of the present invention is to provide a brake control device in which maintenance can be performed by independently removing the variable load valve without disassembling the components of the main unit.

Means for Solving the Problems

A brake control device of a first aspect of the present invention comprises: a relay valve that generates a first drive pressure for driving a brake, from an air pressure generated by a first air supply source, based on an pilot pressure applied; a double check valve that connects the relay valve and a second air supply source that generates a second drive pressure separate to the first air supply source, and that communicates the drive pressure which is generated in either the relay valve or the second air supply source, with the brake; a variable load valve that outputs a first pressure according to a pressure of an air spring fitted on a vehicle side; a first solenoid valve group which generates the pilot pressure from the air pressure during service operation; and a second solenoid valve group which outputs, as the pilot pressure, a second pressure according to the first pressure output from the variable load valve during emergency operation. The relay valve, the double check valve, the first solenoid valve group, and the second solenoid valve group are integrally configured as a main unit, and the variable load valve is fitted to an outside face of the main unit which is accessible from the outside, so as to be removable from the outside.

According to the brake control device of the first aspect of the present invention, by installing the variable load valve which requires maintenance, on the main unit, such that it can be accessed from the outside and removed, the variable load valve alone can be independently removed for maintenance, without disassembly of the configuration of the main unit.

Moreover, According to the brake control device of a second aspect of the present invention, in the first aspect, an adjustment mechanism which adjusts an output value relative to an input value may be provided on the variable load valve so as to be accessible in a condition to be attached to the main unit.

According to the brake control device of the second aspect of the present invention, it is possible to carry out correction using the adjustment mechanism without removing the peripheral devices of the variable load valve.

According to the brake control device of a third aspect and a fourth aspect of the present invention, in the first aspect or the second aspect, the relay valve and the double check valve are integrally configured as a valve block, and the main unit is configured with the first solenoid valve group and the second solenoid valve group attached to the valve block, and the variable load valve may be attached to one face of the valve block serving as the outside face.

According to the brake control device of the third and the fourth of the present invention, by configuring the relay valve and the double check valve as a valve block in one unit to make these compact, and attaching the variable load valve to the valve block, the size of the pipe seat that connects the valve block and the variable load valve, to the first air supply source or the brake side, can be kept to a minimum.

Effects of the Invention

In the above-mentioned brake control device, the variable load valve which requires maintenance, is fitted to the main unit so as to be accessible and removable from the outside. As a result the variable load valve alone can be independently removed for maintenance, without disassembling the configuration of the main unit.

BEST MODE FOR CARRYING OUT THE INVENTION

Next, a brake control device according to an embodiment of the present invention is described with reference to the drawings. The embodiment described below is a preferred specific example of the brake control device of the present invention, and is subject to various restrictions considered technically favorable. However, the technical scope of the invention is not limited thereto unless specifically stated. Furthermore, the constituent elements of the embodiment described below can be replaced and substituted as needed by existing constituent elements or the like, and a number of variations are possible including combinations with other existing constituent elements. Accordingly, the descriptions of the embodiment below are not to be construed as limiting the contents of the invention as described in the claims.

The brake control device according to one embodiment of the present invention is a control device for a brake device for braking (specifically air braking) a rail vehicle, which controls the flow of compressed air supplied to a brake cylinder serving as a brake device provided for each axle. Furthermore, in this embodiment, because the brake control device simultaneously brakes the two axles at the front and rear of one carriage (vehicle), flow control of compressed air to the brake cylinders is performed separately for each brake cylinder.

Figure 1:
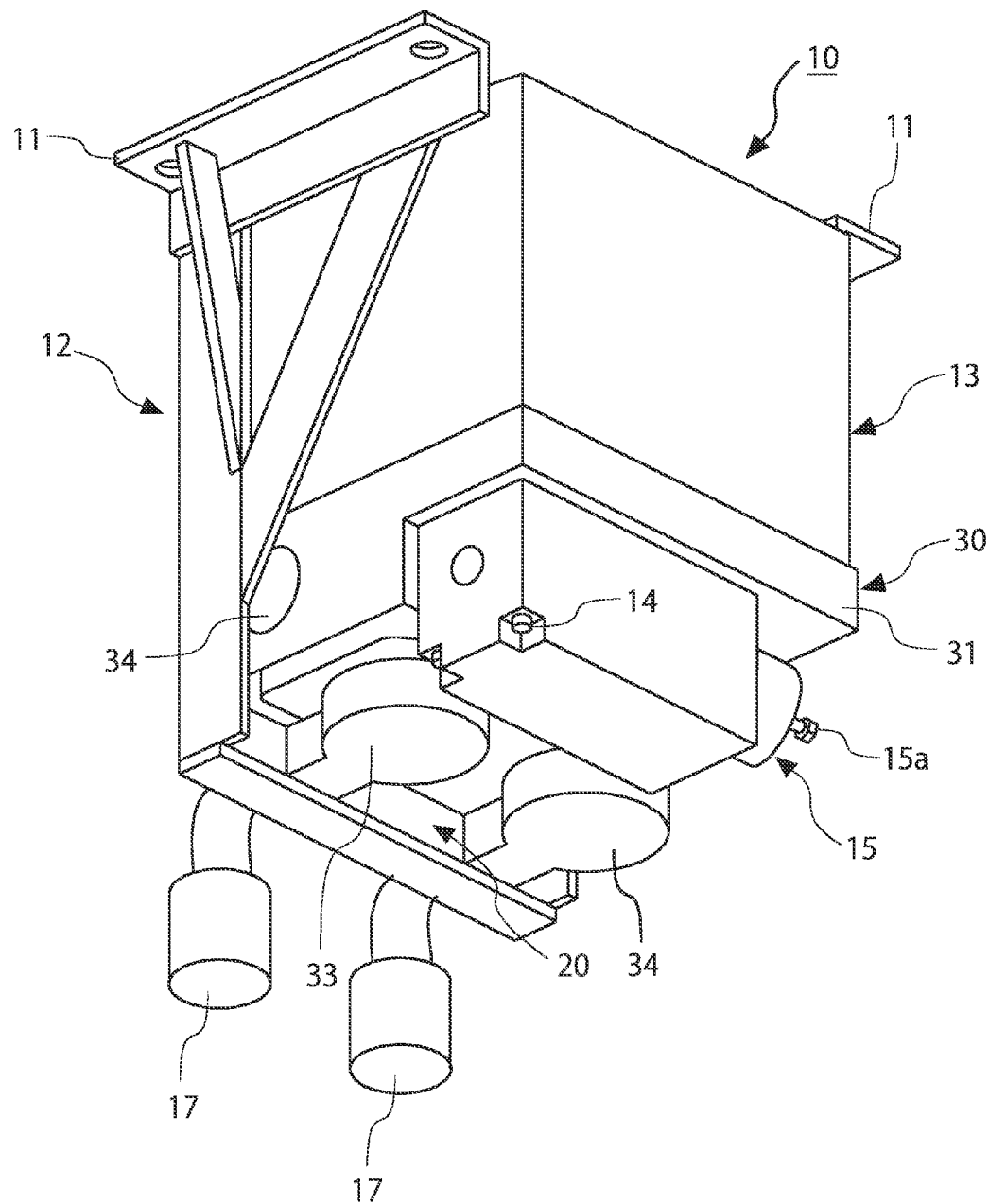
FIG. 1 is a perspective view of a brake control device according to an embodiment of the present invention, viewed from the base direction.
Figure 2:
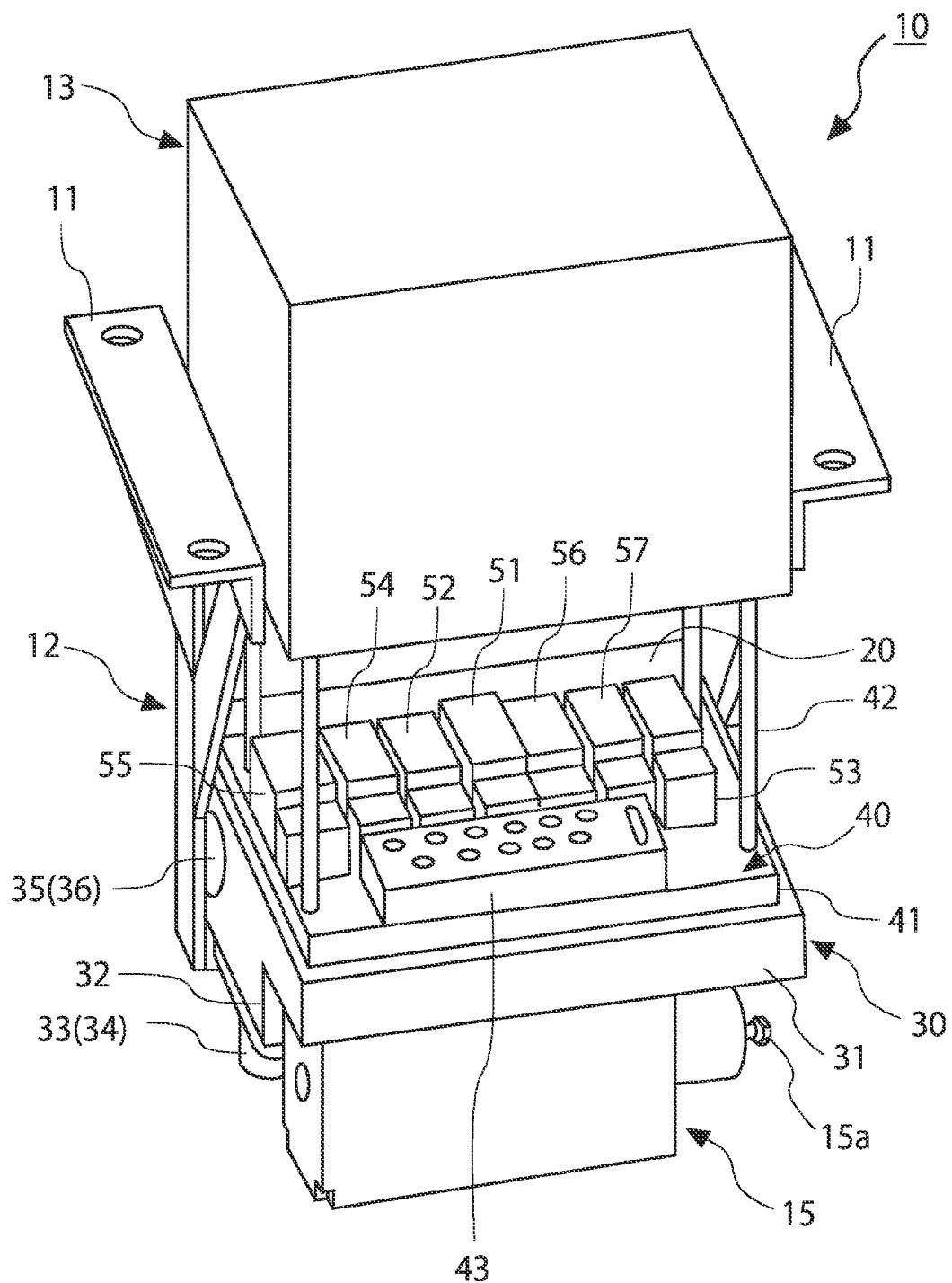
FIG. 2 is a perspective view of the brake control device according to the embodiment of the present invention, viewed from the planar direction.
Figure 3:
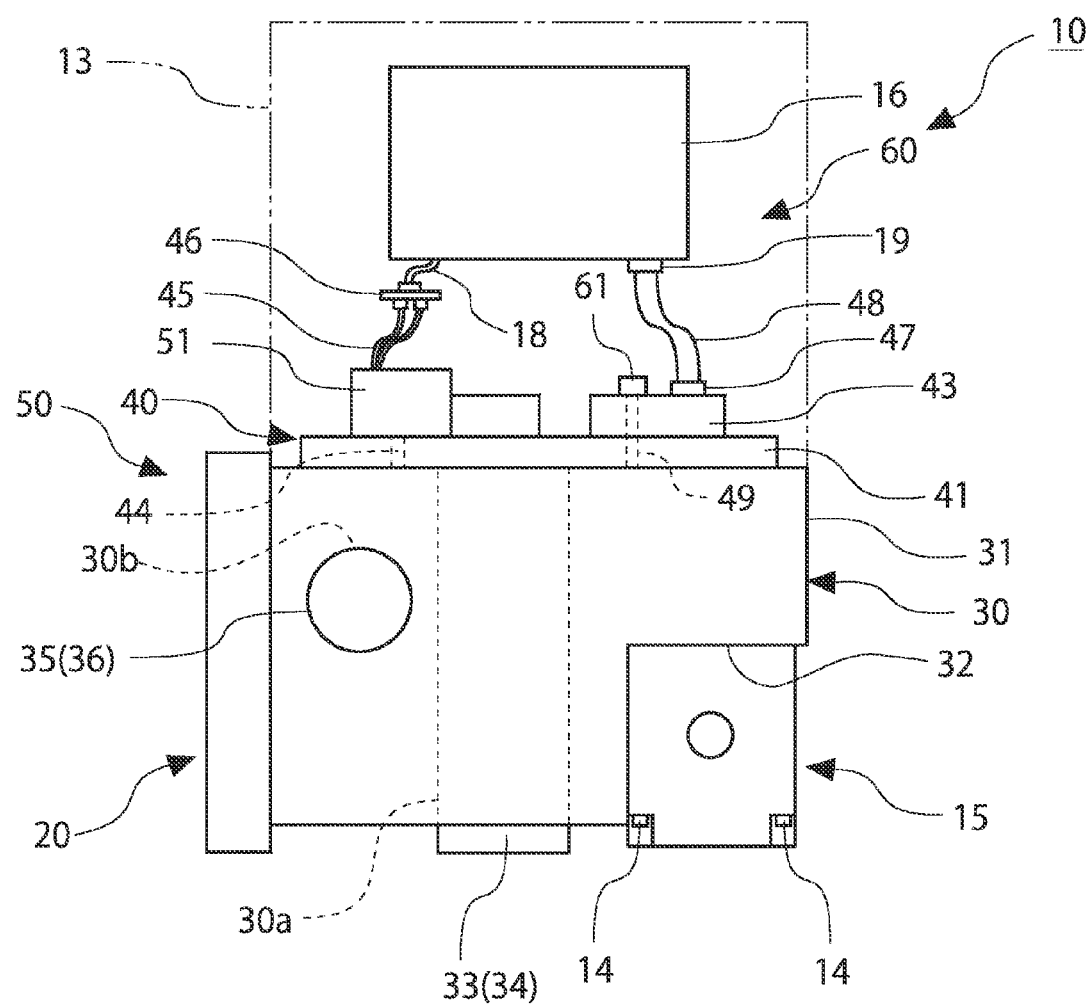
FIG. 3 is a schematic front view of the brake control device according to the embodiment of the present invention.

In FIG. 1 to FIG. 3, the brake control device 10 is held by a frame 12 comprising a bracket 11 to be secured to a vehicle (not shown in the figure). Furthermore, the brake control device 10 comprises; a casing 13 in the shape of a housing open at the bottom, a pipe seat 20 secured to the frame 12, a valve block 30 secured to the pipe seat 20, an electropneumatic plate (plate) 40 which is always covered by the casing 13 and is secured to the top surface of the valve block 30, a variable load valve 15 secured to the valve block 30 by bolts 14, and a controller 16 which performs various controls related to braking. Furthermore, the pipe seat 20, the valve block 30, and the electropneumatic plate 40 constitute a main unit 50, and this main unit 50 together with the variable load valve 15 and the controller 16 constitute an air braking section 60. The method of securing the variable load valve 15 to the valve block 30, provided that the securing method is capable of maintaining a seal, can use securing means other than the bolts 14. Furthermore, although the pipe seat 20 is made of steel in the present embodiment, other materials such as aluminum can be used to form the pipe seat 20.

Figure 4:
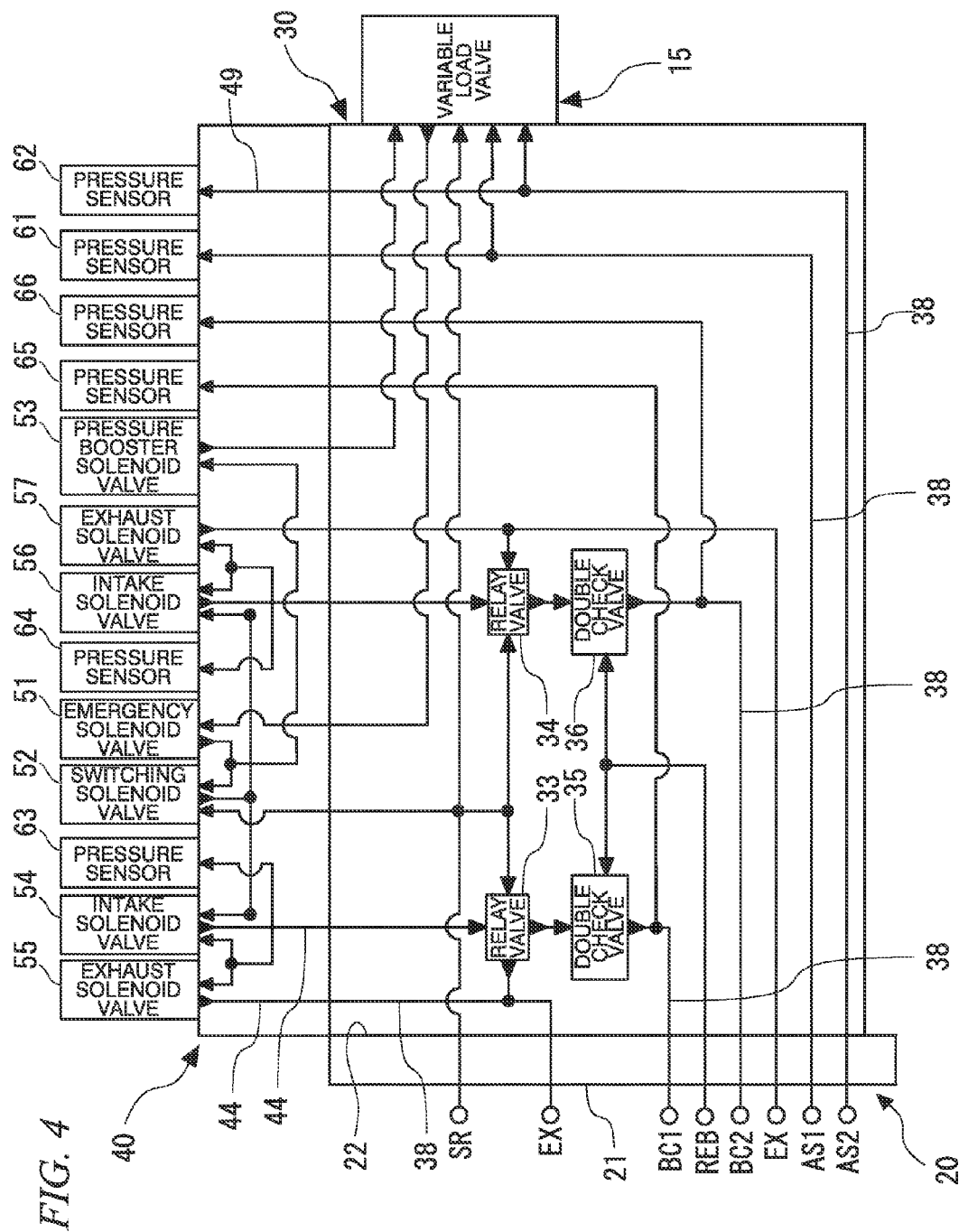
FIG. 4 is an explanatory drawing showing schematic piping routes of the brake control device according to the embodiment of the present invention.

As shown in FIG. 4, a first surface (outer surface side) 21 of the pipe seat 20 comprises; an input port into which air pressure for brake application is input from a first air supply source SR during service and emergency operation, an output port which outputs a drive pressure for driving brakes BC1 and BC2, an input port into which the pressure of air springs AS1 and AS2 attached to the vehicle is input, an output port which vents air from the various exhaust ports EX, and an input port into which the air pressure for brake application is input from a second air supply source REB. Furthermore, the pipe seat 20, on a second surface (inner surface side) 22 thereof which supports the valve block 30, comprises input and output ports which communicate with flow channels (support member internal air channels) of these input and output ports and the valve block 30. Accordingly, inside the pipe seat 20, flow channels (support member internal air channels) which connect between the ports of the first surface 21 and the second surface 22 are formed in predetermined routes corresponding to the arrangement of the valve block 30. In FIG. 4, because the specific configuration of the above-mentioned, the first air supply source SR, the brakes BC1 and BC2, the air springs AS1 and AS2, and the various exhaust ports EX is not significant in the context of one embodiment, these components are omitted from the figure and represented by circles. Furthermore, FIG. 4 shows the brake control device 10 according to one embodiment of the present invention schematically, and should not be construed as limiting the arrangement and the like of the components. Thus, the pipe seat 20 mounted to the brake control device 10 according to one embodiment of the present invention can have a simple construction because only the input and output ports and flow channels are formed therein. In the pipe seat 20, for example, a silencer 17 which suppresses the ambient noise of the exhaust from the exhaust ports EX is provided.

Figure 5:
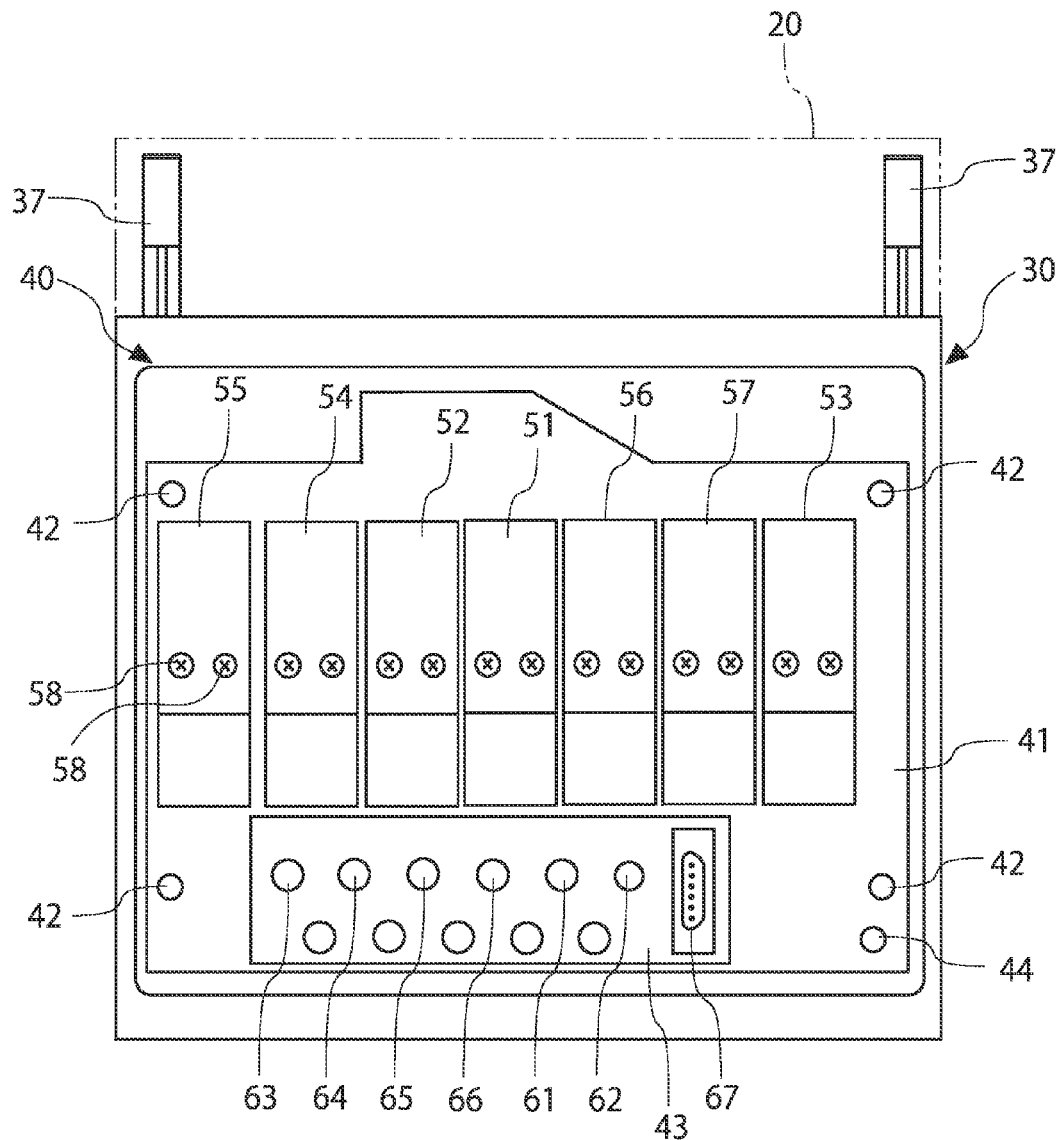
FIG. 5 is a plan view of an electropneumatic plate installed in the brake control device according to the embodiment of the present invention.

The valve block 30 is composed of a block (chassis) made of metal (for example aluminum), and in a surface (outside face) 31 thereof there is formed a recess section 32 for mounting the variable load valve 15. In the top surface of the recess section 32 is formed a female screw hole (not shown) into which the bolts 14 are threaded. Consequently, by removing the bolts 14 directly from the outside, the variable load valve 15 can be easily removed for replacement or the like. Furthermore, as shown in FIG. 3, a valve insertion section 30a into which a pair of relay valves 33 and 34 are removably inserted from a bottom surface side thereof, and a valve insertion section 30b into which a pair of double check valves 35 and 36 are removably inserted from the side surface thereof are formed in the valve block 30. Furthermore, as shown in FIG. 5, leg sections 37 for connecting to the pipe seat 20 protrude from the back surface of the valve block 30. As shown in FIG. 4, ports and the like (not shown) which communicate with the input and output ports (on the second surface 22 side) of the pipe seat 20 described above, are provided in the back surface of the valve block 30.

The electropneumatic plate 40, as shown in FIG. 5, comprises: a plate body 41; guide shafts 42 standing upright from the vicinity of the four corners of the plate body 41, which support the casing 13; a plurality of solenoid valves 51 to 57 (in one embodiment, an emergency solenoid valve 51, a switching solenoid valve 52, an pressure solenoid valve 53, and each pairing of an intake solenoid valve 54 and exhaust solenoid valve 55 and of an intake solenoid valve 56 and exhaust solenoid valve 57) secured to the plate body 41; and an electrical block 43 on which a plurality of pressure sensors 61 through 66 and a connector 67 are disposed. The solenoid valves 51 to 57 comprise connecting bolts 58 which connect solenoid valve control signal wires 45 shown in FIG. 3 and FIG. 5. Furthermore, in the plate body 41 there are formed solenoid valve connecting air channels 44 which communicate between the solenoid valves 51 through 57 and the valve block 30.

Figure 6:
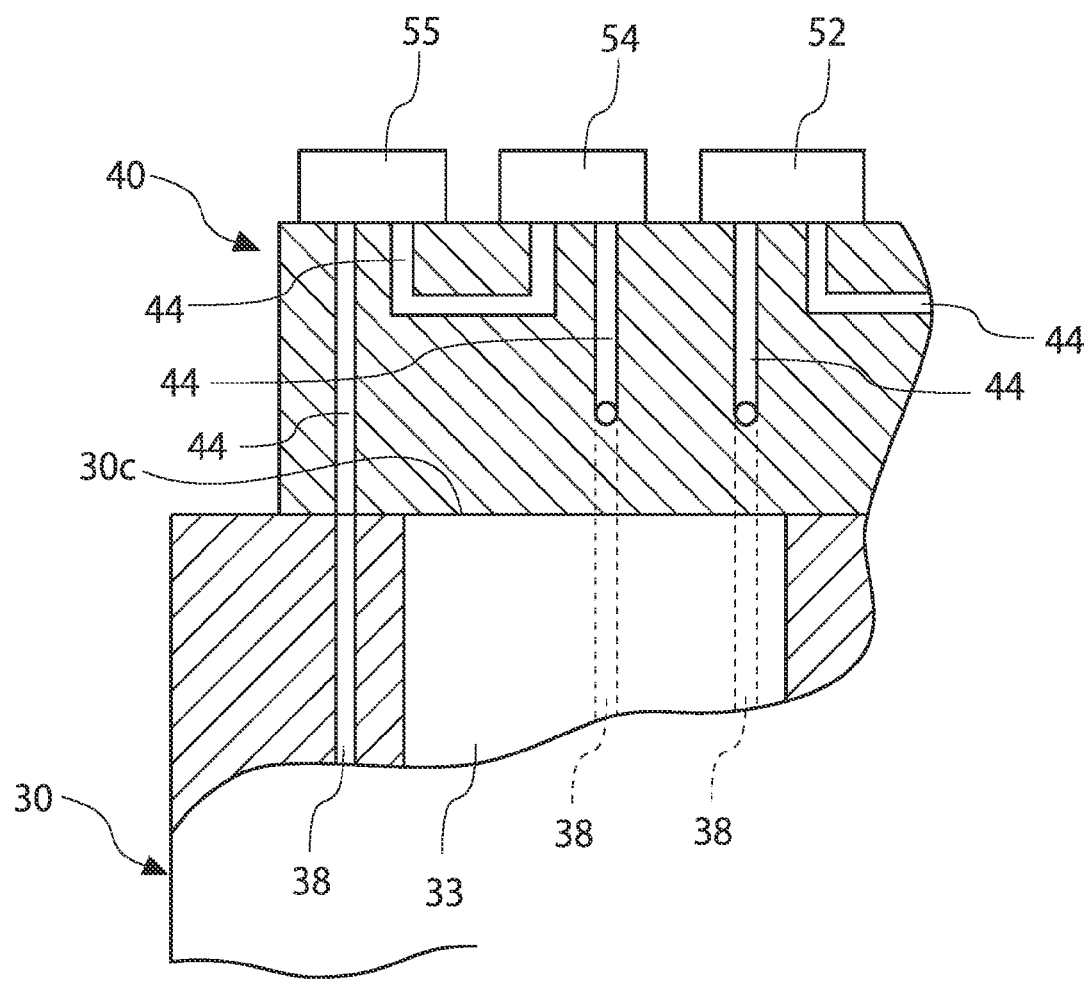
FIG. 6 is an enlarged cross-sectional view showing the main components of the brake control device according to the embodiment of the present invention.

The solenoid valve connecting air channels 44, for example, as shown in FIG. 6, are formed to pass through between the top and bottom surfaces of the plate body 41 so as to extend between the solenoid valves 51 through 57 (solenoid valves 55, 54, and 52 in FIG. 6) and the valve block 30 (or the pipe seat 20). At this time, in those parts of the valve block 30 where the relay valves 33 and the like are arranged, the solenoid valve connecting air channels 44 follow an indirect route incorporating bends and the like so as to avoid the relay valves 33 and the like. As a result, the valve block 30 (or the pipe seat 20) can communicate with the support member internal air channels 38. Furthermore, the valve insertion section 30a into which the relay valves 33 and 34 are inserted, passes completely through the valve block 30 such that there is an opening 30c in the top surface (onet surface) of the valve block 30.

As shown in FIG. 3, solenoid valve control signal wires 45 are connected to the solenoid valves 51 to 57.

Furthermore, the solenoid valve control signal wires 45 are connected to a relay connector 46. In turn, the relay connector 46 and the controller 16 are connected by a control signal wire 18. At this time, the solenoid valve control signal wires 45 of at least two of the solenoid valves 51 to 57 may be connected to the relay connector 46, and a plurality of relay connectors 46 may be used if required.

The wiring of the pressure sensors 61 to 66 are connected through a connector 47 provided on the electrical block 43 and a connector 19 of the controller 16 are connected via a pressure detection wire (for example a flexible cable) 48. In addition, in the electropneumatic plate 40, sensor air channels 49 are formed which connect to the pressure sensors 61 to 66. The solenoid valve connecting air channels 44, support member internal air channels 38, and sensor air channels 49 shown in FIG. 3 and FIG. 6 are for convenience of explanation, and do not show the actual piping routes. Furthermore, in FIG. 4, the solenoid valve connecting air channels 44, the support member internal air channels 38, and the sensor air channels 49 are shown by lines for schematic piping routes (channels). In FIG. 4, the respective input and output flow ports are indicated by a line (showing direction of input and output).

The variable load valve 15 outputs an emergency control pressure according to the variable load signal pressure from the air springs AS1 and AS2 indicating pressure variation in proportion to the total weight of the vehicle including the weight of passengers and the like. Furthermore, on the side surface of the variable load valve 15 is provided an adjustment screw (adjustment mechanism) 15a which adjusts the output value (emergency control pressure) relative to the input value from the air springs AS1 and AS2, allowing for easy access from outside.

Next, the functions of the various valves for flow adjustment and the like of the compressed air are described with reference to the explanatory drawing of connection routes shown in FIG. 7. In the present embodiment, the brake control device 10 comprises three brake systems 71, 72, and 73 for service brake, emergency brake, and security brake.

As the solenoid valves 51 to 57 described above, in the present embodiment there are provided one each of an emergency solenoid valve 51, a switching solenoid valve 52, and a pressure solenoid valve 53. Also provided are two pairings of valves, one comprising an intake solenoid valve 54 and an exhaust solenoid valve 55, and the other an intake solenoid valve 56 and an exhaust solenoid valve 57. Each pairing of an intake solenoid valve 54 and exhaust solenoid valve 55 and of an intake solenoid valve 56 and exhaust solenoid valve 57 corresponds to a relay valve 33 and 34 respectively.

Figure 7:
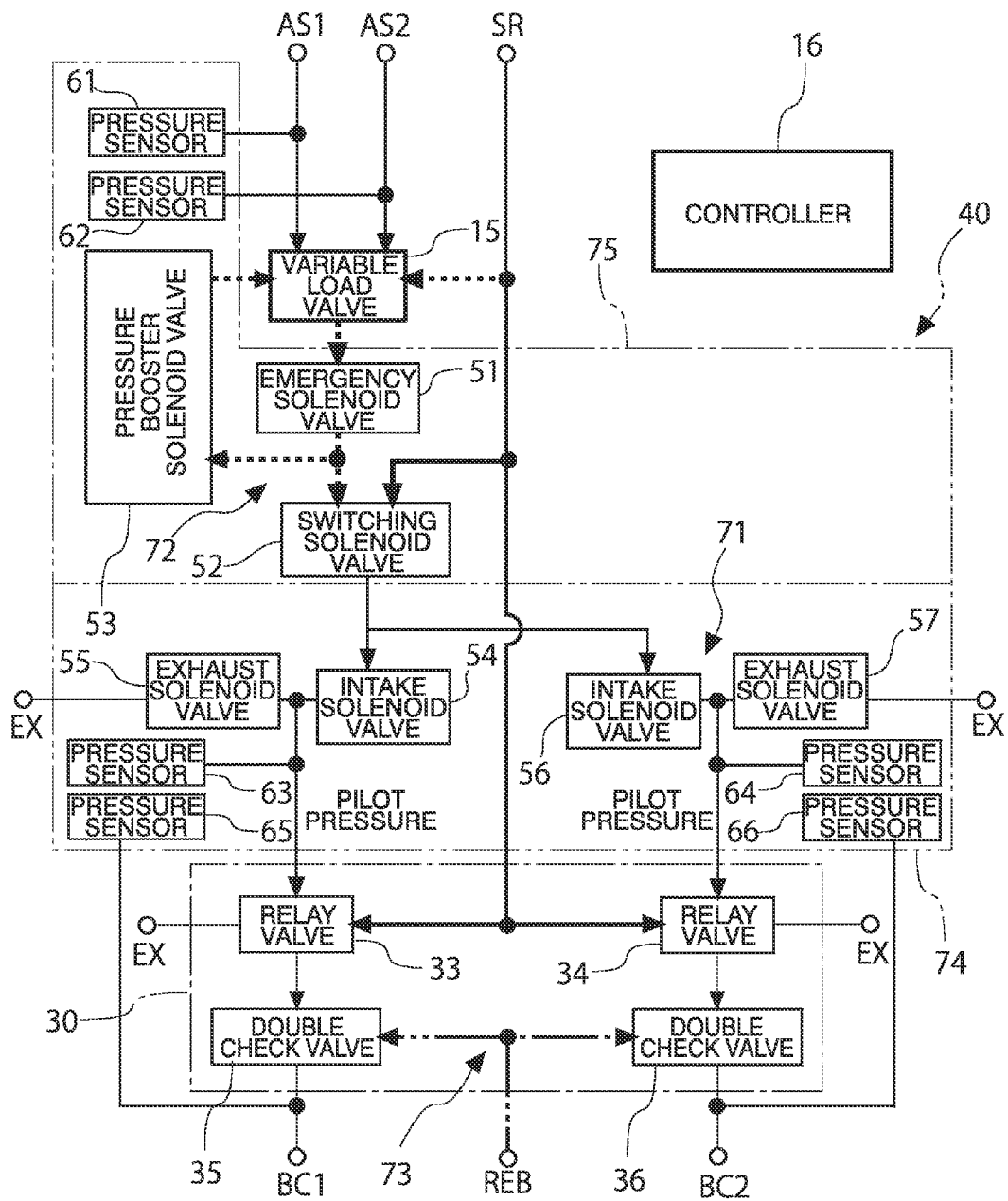
FIG. 7 is an explanatory drawing of a brake system in the brake control device according to the embodiment of the present invention.

In the brake system 71 for service operation indicated by the bold solid lines in FIG. 7, air pressure supplied from the first air supply source SR is supplied to the switching solenoid valve 52, and is then supplied from this switching solenoid valve 52 to the pairings of an intake solenoid valve 54 and exhaust solenoid valve 55 and an intake solenoid valve 56 and exhaust solenoid valve 57, regulated to a predetermined pilot pressure (for example 880 kPa) by the intake solenoid valve 54 and the exhaust solenoid valve 55 and the intake solenoid valve 56 and the exhaust solenoid valve 57, and then supplied to the relay valves 33 and 34.

In the brake system 72 for emergency operation indicated by the bold dashed lines in FIG. 7, the air pressure supplied from the first air supply source SR is regulated by the variable load valve 15 with reference to the air pressure output from the air springs AS1 and AS2. At this time, to the variable load valve 15 is connected the pressure solenoid valve 53, which amplifies the air pressure of the predetermined pilot pressure (for example 400 kPa) output from the emergency solenoid valve 52 [51].

In an emergency (for example when the main power supply turns off), the emergency solenoid valve 51, the switching solenoid valve 52, and the pairings of the intake solenoid valve 54 and exhaust solenoid valve 55 and the intake solenoid valve 56 and exhaust solenoid valve 57 transition to an open state, and the amplified air pressure (pilot pressure) output from the variable load valve 15 is passed directly through, in functional terms, and supplied to the relay valves 33 and 34.

The purpose of the relay valves 33 and 34 is to regulate the amount of compressed air (the compressed air pressure) supplied to the corresponding brake BC1 or BC2. In service operation, the compressed air is supplied directly to the respective relay valves 33 and 34 from the first air supply source SR. One pairing of an intake solenoid valve 54 or 56 and an exhaust solenoid valve 55 or 57, whose purpose is to produce (control the pressure) the pilot pressure for moving the valves of the relay valves 33 and 34, is provided for each of the relay valves 33 and 34.

The double check valves 35 and 36 are connected to the relay valves 33 and 34 and are shared by the brake system 71 for service operation and the brake system 72 for emergency operation, and are also connected to the brake system 73 for security operation shown by the bold two dot chain line in FIG. 7. The double check valves 35 and 36 are supplied directly with air pressure from the second air supply source REB.

As a result, the double check valves 35 and 36 supply the pilot air pressure supplied to the relay valves 33 and 34 by the brake system 71 during service operation, to the brakes BC1 and BC2 as a drive pressure (first drive pressure). Furthermore, the double check valves 35 and 36 supply the pilot air pressure supplied to the relay valves 33 and 34 by the brake system 72 during emergency operation, to the brakes BC1 and BC2 as the drive pressure (second drive pressure). In addition, the double check valves 35 and 36 supply the air pressure supplied from the second air supply source REB by the brake system 73 during security operation, to the brakes 13C1 and BC2 as the drive pressure.

On the other hand, each of the pressure sensors 61 to 66, the output pressure of the air springs AS1 and AS2 is detected by the pressure sensors 61 and 62, the output pressure (pilot pressure) from each pairing of the intake solenoid valve 54 and exhaust solenoid valve 55 and the intake solenoid valve 56 and exhaust solenoid valve 57 is detected by the pressure sensors 63 and 64, and the drive pressure of the double check valves 35 and 36 is detected by the pressure sensors 65 and 66. Furthermore, the detection signals (pressure signals) thereof are output to the controller 16. The controller 16 controls, based on these detection signals, for example, the amplification by the pressure solenoid valve 53, and the pressure regulation by each pairing of the intake solenoid valve 54 and exhaust solenoid valve 55 and the intake solenoid valve 56 and exhaust solenoid valve 57.

Incidentally, each of the pairings of the intake solenoid valve 54 and exhaust solenoid valve 55 and the intake solenoid valve 56 and exhaust solenoid valve 57 constitute a first solenoid valve group 74 which generates a pilot pressure from the air pressure generated by the first air supply source SR during service operation. The emergency solenoid valve 51, the pressure solenoid valve 53, and the switching solenoid valve 52 constitute a second solenoid valve group 75 which outputs, as a pilot pressure, a pressure (first pressure) according to the pressure output from the variable load valve 15 during emergency operation. Here, when the pressure output from the variable load valve 15 is to be amplified by the pressure solenoid valve 53, the pressure output from the variable load valve 15 is input into and amplified by the pressure solenoid valve 53, the amplified pressure is input into the variable load valve 15, and the pressure (second pressure) amplified in proportion to the input pressure is output by the variable load valve 15 to serve as the pilot pressure. Furthermore, if the pressure is not to be amplified by the pressure solenoid valve 53, the pressure output from the variable load valve 15 serves as the pilot pressure directly.

In this way, the brake control device 10 of the present embodiment comprises: a pair of relay valves 33 and 34 that generate a drive pressure for driving the brakes BC1 and BC2, from air pressure generated by the first air supply source SR; a pair of double check valves 35 and 36 that connect the relay valves 33 and 34 to the second air supply source REB that generates a drive pressure separate to the first air supply source SR, and that communicate the drive pressure from either one of the relay valves 33 and 34 or the second air supply source REB, with the brakes BC1 and BC2; a variable load valve 15 the outputs a pressure according to the pressure of the air springs AS1 and AS2; a first solenoid valve group 74 which generates the pilot pressure from the air pressure generated by the first air supply source SR during service operation; and a second solenoid valve group 75 which outputs, as the pilot pressure, a drive pressure according to the pressure output from the variable load valve 15 during emergency operation. As a result, the brake mechanism can be controlled by three types of system, namely; the brake system 71 (for service brake) that outputs a drive pressure for the brakes BC1 and BC2 controlled by the first solenoid valve group 74; a brake system 72 (for emergency brake) that outputs a drive pressure for the brakes BC1 and BC2, controlled by the second solenoid valve group 75 and the variable load valve 15; and a brake system 73 (for security brake) that outputs as a drive pressure for the brakes BC1 and BC2, a pressure of air supplied from the air supply source REB for security. Furthermore, in the brake control device 10 of the present embodiment, the relay valves 33 and 34, the double check valves 35 and 36, the first solenoid valve group 74, and the second solenoid valve group 75 are integrally configured as the main unit 50, and the variable load valve 15 is fitted to the outside face 31 of the main unit 50 which is accessible from the outside, so as to be removable from the outside. As a result by installing the variable load valve 15 which requires maintenance, on the main unit 50, such that it can be accessed from the outside and removed, the variable load valve 15 alone can be independently removed for maintenance, without disassembly of the configuration of the main unit 50.

Moreover, the adjustment screw (adjustment mechanism) 15*a* which adjusts the output value relative to the input value is provided on the variable load valve 15 so as to be accessible in a condition with the variable load valve 15 attached to the main unit 50. As a result it is possible to carry out correction using the adjustment screw 15*a* without removing the peripheral devices of the variable load valve 15.

Furthermore, the relay valves 33 and 34 and the double check valves 35 and 36 are integrally configured as a valve block 30, and the main unit is constructed with the first solenoid valve group 74 and the second solenoid valve group 75 attached to the valve block 30, and the variable load valve 15 is attached to one face of the valve block 30 serving as the outside face 31. As a result, by configuring the relay valves 33 and 34 and the double check valves 35 and 36 as a valve block 30 in one unit to make these compact, and attaching the variable load valve 15 to the valve block 30, the size of the pipe seat 20 that connects the valve block 30 or the variable load valve 15, and the first air supply source SR or the brakes 13C1 and BC2 side, can be kept to a minimum.

DESCRIPTION OF THE REFERENCE SYMBOLS

AS1 Air spring
AS2 Air spring
SR First air supply source
REB Second air supply source
EX Exhaust port
BC1 Brake
BC2 Brake
10 Brake control device
11 Bracket
12 Frame
13 Casing
14 Bolt
15 Variable load valve
15*a* Adjustment screw (adjustment mechanism)
16 Controller
17 Silencer
18 Control signal wire
19 Connector
20 Pipe seat
21 First surface
22 Second surface
30 Valve block
30*a* Valve insertion section
30*b* Valve insertion section
30*c* Opening
31 Surface (outside face)
32 Recess section
33, 34 Relay valve
35, 36 Double check valve
37 Leg section
38 Support member internal air channels
40 Electropneumatic plate (plate)
41 Plate body
42 Guide shaft
43 Electrical block
44 Solenoid valve connecting air channel
45 Solenoid valve control signal wire
46 Relay connector
47 Connector
48 Pressure detection wire
49 Sensor air channel
50 Main unit
51 Emergency solenoid valve
52 Switching solenoid valve
53 Pressure solenoid valve
54, 56 Intake solenoid valve
55, 57 Exhaust solenoid valve
58 Wire 60 Air braking section
61 to 66 Pressure sensor
67 Connector
71 Brake system for service operation
72 Brake system for emergency operation
73 Brake system for security operation
74 First solenoid valve group
75 Second solenoid valve group

The invention claimed is:
1. A brake control device comprising:
   a relay valve that supplies a first drive pressure for driving a brake, from an air pressure generated by a first air supply source, based on a pilot pressure applied;
   a double check valve that connects the relay valve and a second air supply source that generates a second drive pressure separate to the first air supply source, and that communicates either the first drive pressure from the relay valve or the second drive pressure from the second air supply source, with the brake;
   a variable load valve that outputs a first pressure according to a pressure of an air spring;
   a first solenoid valve group that supplies the pilot pressure from the air pressure of the first air supply source during service operation; and
   a second solenoid valve group that outputs, as the pilot pressure, a second pressure according to the first pressure output from the variable load valve during emergency operation, wherein
   a main unit is configured with a valve block, the first solenoid valve group, and the second solenoid valve group,
   an outer surface of the valve block forms an outer surface of the brake control device,
   the valve block is configured with the relay valve and the double check valve, and the first solenoid valve group and the second solenoid valve group are attached to the valve block, and
   the valve block has a recess section as an opening on a bottom surface side and a side surface of the valve block, and the variable load valve is attached to the recess section from outside of the brake control device.

2. A brake control device according to claim 1, wherein the variable load valve has an adjustment mechanism that adjusts an output value relative to an input value and is located on the variable load valve to be accessible when the variable load valve is to be attached to the main unit.

* * * * *